(12) United States Patent
Strassburger et al.

(10) Patent No.: US 8,794,478 B2
(45) Date of Patent: Aug. 5, 2014

(54) METHOD FOR PRODUCING A PRESSURE TANK, A PRESSURE TANK AND A PRESSURE TANK GROUP

(75) Inventors: Philipp Strassburger, Stuttgart (DE); Sivakumara Kannappan Krishnamoorthy, Stuttgart (DE); Michael Kriescher, Stuttgart (DE); Günther Erdl, Bermatingen (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 0 days.

(21) Appl. No.: 13/455,655

(22) Filed: Apr. 25, 2012

(65) Prior Publication Data

US 2012/0234840 A1    Sep. 20, 2012

(51) Int. Cl.
*F17C 1/06* (2006.01)
*F17C 1/04* (2006.01)

(52) U.S. Cl.
CPC ... *F17C 1/06* (2013.01); *F17C 1/04* (2013.01); *F17C 2203/011* (2013.01)
USPC ............................... 220/590; 220/589

(58) Field of Classification Search
CPC ................ F17C 1/06; F17C 1/04; F17C 1/02; F17C 2203/011; F17C 2203/01
USPC ............... 220/590, 589, 588, 586, 23.4, 23.2; 206/0.6
IPC ........................ F17C 1/06, 1/04, 1/02
See application file for complete search history.

(56) References Cited

U.S. PATENT DOCUMENTS

| | | | | | |
|---|---|---|---|---|---|
| 2,268,961 | A | * | 1/1942 | Gwynne et al. | 220/588 |
| 2,718,583 | A | * | 9/1955 | Noland et al. | 392/458 |
| 2,744,043 | A | * | 5/1956 | Ramberg | 156/155 |
| 2,848,133 | A | * | 8/1958 | Ramberg | 220/590 |
| 3,002,534 | A | * | 10/1961 | Noland | 138/141 |
| 3,073,475 | A | * | 1/1963 | Fingerhut | 220/590 |
| 3,112,234 | A | * | 11/1963 | Krupp | 156/169 |
| 3,540,615 | A | * | 11/1970 | Burkley et al. | 220/560.13 |
| 3,815,773 | A | * | 6/1974 | Duvall et al. | 220/590 |
| 3,969,812 | A | * | 7/1976 | Beck | 29/421.1 |

(Continued)

FOREIGN PATENT DOCUMENTS

| | | |
|---|---|---|
| DE | 3010958 | 10/1981 |
| DE | 3026116 | 2/1982 |

(Continued)

*Primary Examiner* — Robert J Hicks
(74) *Attorney, Agent, or Firm* — Womble Carlyle Sandridge & Rice, LLP

(57) ABSTRACT

The present invention provides a method for producing a pressure tank for holding a pressurized fluid, comprising the steps of providing a shaped body; arranging one or more elements of a textile sheet material of reinforcing fibers on the shaped body; impregnating the reinforcing fibers, before or after the arrangement of the element or elements on the shaped body, with a thermosetting or thermoplastic resin; and curing the resin to form a composite fiber material surrounding the shaped body. The invention also provides a pressure tank for holding a pressurized fluid, comprising a hollow body which defines a storage space for the fluid, and a composite fiber material surrounding the hollow body which comprises one or more elements of a textile sheet material. The invention further provides a pressure tank group comprising a plurality of such pressure tanks.

24 Claims, 3 Drawing Sheets

(56) References Cited

U.S. PATENT DOCUMENTS

| | | | |
|---|---|---|---|
| 4,544,428 A | | 10/1985 | Mandel |
| 4,905,856 A | * | 3/1990 | Krogager ............... 220/588 |
| 2005/0161452 A1 | * | 7/2005 | DaSilva et al. ............ 220/23.4 |
| 2007/0246461 A1 | * | 10/2007 | Shimada et al. ............ 220/4.12 |
| 2008/0201932 A1 | * | 8/2008 | Schlag ............... 29/452 |
| 2009/0277568 A1 | | 11/2009 | Weimer |
| 2009/0314785 A1 | * | 12/2009 | Cronin et al. ............ 220/590 |

FOREIGN PATENT DOCUMENTS

| | | |
|---|---|---|
| DE | 19803909 | 8/1999 |
| DE | 10217245 | 11/2003 |
| DE | 10217246 | 11/2003 |
| DE | 10217247 | 11/2003 |
| EP | 0503142 | 9/1992 |
| WO | WO 01/64427 | 9/2001 |

* cited by examiner

METHOD FOR PRODUCING A PRESSURE TANK, A PRESSURE TANK AND A PRESSURE TANK GROUP

CROSS-REFERENCE TO RELATED APPLICATION

The present disclosure relates to the subject matter disclosed in German patent application number 10 2010 043 645.3 of Nov. 9, 2010, which is incorporated herein by reference in its entirety and for all purposes.

BACKGROUND OF THE INVENTION

The present invention relates to a method for producing a pressure tank for holding a pressurized fluid.

The invention also relates to a pressure tank for holding a pressurized fluid, as well as to a pressure tank group.

Pressure tanks are employed in, e.g., motor vehicles as a means for storing gaseous fuels such as natural gas or hydrogen. Due to the high pressure, the pressure tank must be able to withstand considerable forces. In the case of metallic pressure tanks (e.g., tanks of the class CNG-1 meeting the standard ISO 11439), this can only be achieved by making the walls thereof sufficiently thick, whereby the weight of such tanks is relatively high.

A more favorable relationship between strength and weight can be achieved by utilizing pressure tanks having a reinforcing fiber that is impregnated with a resin wrapped around them. In the case of tanks of classes CNG-2 and CNG-3, metallic hollow bodies (which are also referred to as liners) are coated with a winding consisting of a continuous fiber, whereby here, both the liner and the fiber winding contribute to the ability of the pressure tank to withstand the forces applied thereto. In the case of tanks of class CNG-4, it is the fiber winding alone that is responsible for the strength of the assembly so that a non-load-bearing liner can be used, and, in particular, one consisting of a synthetic material.

The process of wrapping hollow bodies with a continuous fiber for producing pressure tanks in accordance with the state of the art is a relatively laborious process and, in addition, there are certain restrictions associated therewith. As a general rule, the pressure tanks have a cylindrical shape with substantially hemispherical axial end regions, whereby the possible fiber orientations are heavily restricted due to this geometry. In particular, the wrap angle is restricted since the fibers within the end regions of the tank can easily slip. These restrictions are even more significant in the case of freely configurable pressure tanks that deviate from a cylindrical shape with hemispherical end regions so that tighter radii or edges arise. In order to achieve satisfactory force-withstanding properties from the fiber wrapping process, complex multi-axial plies have to be deployed.

The present invention provides a simplified and more advantageous method for producing a pressure tank for holding a pressurized fluid.

The invention also provides a pressure tank for holding a pressurized fluid which is of high strength and which can be produced at relatively low costs, as well as a pressure tank group comprising a plurality of such pressure tanks.

SUMMARY OF THE INVENTION

According to one embodiment of the invention, the inventive method comprises the following steps:
providing a shaped body;
arranging one or more elements of a textile sheet material of reinforcing fibers on the shaped body;
impregnating the reinforcing fibers, before or after the arrangement of the element or elements on the shaped body, with a thermosetting or thermoplastic resin; and
curing the resin to form a composite fiber material surrounding the shaped body.

The shaped body is preferably a hollow body which defines a storage space for the fluid. The hollow body can be a liner as in the case of the pressure tanks having a continuous fiber winding wrapped around them that were described above. Alternatively, however, it is also possible for the shaped body to serve merely as a place holder and for it to be removed at the end of the manufacturing process so that the pressure tank then consists substantially of just the shaped composite fiber material.

In contrast to the known manufacturing processes, the fiber reinforcement process in accordance with the invention is not effected by wrapping a continuous fiber around the shaped body or hollow body, but rather by a process of arranging one or more elements of a textile sheet material. In the sense of the present invention, a textile sheet material is to be understood as meaning any material in which the reinforcing fibers are juxtaposed to form a two-dimensional structure, as opposed to a mere arrangement of the fibers as it occurs in the case of a wrapping or suchlike process. The arrangement of elements of such a sheet material leads not only to a substantially simplified handling process and an acceleration of the process in comparison with the state of the art, but automatically leads to an advantageous multi-directional arrangement of the reinforcing fibers on the shaped body, since this arrangement is already present in the textile sheet materials.

It is particularly preferred if the textile sheet material comprises a woven fabric or a braiding of reinforcing fibers. These types of textile sheet materials comprise at least two fiber fractions which run perpendicularly (in the case of a woven fabric) or virtually parallel (in the case of a braiding) with respect to each other. It has been shown that a perpendicular arrangement of two fractions of reinforcing fibers is particularly advantageous in regard to the ability to withstand force and thus the strength of the tank. Further examples of textile sheet materials, which can be used in the context of the invention, are warp- and weft-knitted fabrics and multi-axial fabrics.

The reinforcing fibers of the textile sheet material are preferably selected from carbon fibers, glass fibers, aramide fibers or mixtures thereof, whereby carbon fibers are particularly preferred due to their substantially higher tensile strength.

In particular, the reinforcing fibers are multi-filamentary comprising a plurality of single filaments. The thickness of the reinforcing fibers may typically be within a range of about 0.1 to about 1 mm.

In the sense of the invention, elements of a textile sheet material are any pieces or sections of such a sheet material, wherein the element or the elements are formed and dimensioned in dependence on the shape and size of the shaped body or the pressure tank that is to be produced. The elements used can be formed and/or dimensioned in differing manners. In particular, an element of a textile sheet material can also have a closed shape, i.e., it can be in the form of a tube for example.

In a preferred embodiment of the invention, the element or the elements of a textile sheet material surround the shaped body substantially completely. This makes it possible to produce a pressure tank in which the reinforcing fibers of the textile sheet material accommodate the forces occurring in every part of the pressure tank so that, in particular, a hollow body can be used which itself does not contribute or barely contributes to the process of withstanding forces, or even a shaped body which is subsequently removed. The method of the invention thus enables tanks of high strength and relatively low weight to be produced by means of a method that can be carried out in a relatively simple manner.

It is preferred if the element or the elements of a textile sheet material are adapted to the outer contour of the shaped body. In particular, the formation of cavities between the shaped body and the elements, which would have an unfavorable effect upon the ability of the reinforcing fibers to withstand force, should be prevented. The adaptation of the elements to the outer contour can be effected directly when arranging the elements since the textile sheet materials are frequently of sufficient flexibility, or it can be done beforehand by reshaping the elements by means of suitable methods.

Furthermore, it is preferred that a plurality of elements of a textile sheet material be arranged on the shaped body in such a manner that individual elements partially or completely overlap. Due to the overlap of the elements at the edge regions thereof, it is possible, in particular, to counteract any weakening of the fiber reinforcement in the transition region of different elements.

The elements of a textile sheet material are preferably arranged in multiple layers on the shaped body. In this case, the elements concerned substantially completely overlap. By providing several layers of elements of a textile sheet material, the strength of the resultant pressure tank can be substantially increased.

It is also preferred if different elements of a textile sheet material are arranged on areas of the shaped body having differing outer contours. The elements can differ in regard to their shape, their size and/or the type of textile sheet material. If the elements are arranged in multiple layers, it is particularly preferred for the elements to overlap in a staggered manner in a transition region between different areas of the shaped body. The greater thickness of the overlapping elements in this transition region can be counter-balanced by an appropriate recess in the outer contour of the shaped body.

In a preferred embodiment of the invention, the shaped body is substantially in the form of a cylinder, wherein one or more tubular elements of a textile sheet material are arranged on the circumferential surface of the cylinder. The tubular element of a textile sheet material is preferably a tubular braiding of reinforcing fibers. In consequence, a peripherally closed fiber reinforcement of the shaped body is immediately provided by means of just a single element, whereby in this case too, it is advantageous to arrange further tubular elements in multiple layers on the shaped body for the purposes of increasing the strength of the assembly. In the case of a tubular braiding having a certain degree of flexibility in the circumferential direction, a snug-fitting arrangement on the shaped body is facilitated.

In the case of a pressure tank having a substantially cylindrical shaped body, the axial end regions of the cylinder are preferably formed such that they are substantially hemispherical. In this case, it is particularly advantageous for one or more substantially hemispherically shaped elements of a textile sheet material to be arranged on one or both end regions. Hereby, in particular, the element of a textile sheet material is a woven fabric made of reinforcing fibers, wherein the woven fabric can be given a hemispherical shape by means of a stamping tool for example, or shaped into a hemisphere with a gradual transition to a cylindrical region. As an alternative to the hemispherical shape, the axial end regions of the cylinder and correspondingly the element or the elements of a textile sheet material can also be in the form of a segment of a sphere having an opening angle of less than 180°.

In the case of a cylindrical pressure tank, a connector device is typically provided at one of the ends. In the case of a hollow body consisting of a synthetic material, this connector device may be a so-called insert which is arranged within the hollow body. The insert is formed from a metallic material and can be dimensioned in such a way that it too contributes to the process of withstanding thrust forces so that one can frequently dispense with the need to arrange an element of a textile sheet material on the corresponding end region of the cylinder (i.e., if the insert sufficiently overlaps a tubular element on the circumferential surface of the cylinder). The fiber reinforcement of the pressure tank then comprises just one or more tubular elements (e.g. tubular braidings) on the circumferential surface and one or more substantially hemispherical elements (e.g., reshaped woven fabrics) on the end region of the cylinder located opposite to the connector device. If several elements are provided, they can overlap each other in a staggered manner in the transition region as described above.

In accordance with the invention, the reinforcing fibers of the elements of a textile sheet material are impregnated with a thermosetting or thermoplastic resin in order to form a composite fiber material that surrounds the shaped body after the process of curing the resin. The impregnation process can take place either before the elements are arranged on the shaped body (i.e., the reinforcing fibers are pre-impregnated), or not until afterwards. In each case, the process of curing the resin is effected after the elements have been arranged. Due to the embedding of the reinforcing fibers in a resin, the positions of the reinforcing fibers are fixed, the effective forces are transferred to the reinforcing fibers, and the latter are protected from external effects.

In an advantageous embodiment of the invention, before impregnating the reinforcing fibers, the shaped body is inserted together with the element or the elements of a textile sheet material into a molding device which defines the intended outer contour of the composite fiber material surrounding the shaped body. A smooth and regular external surface of the pressure tank that is to be manufactured can be produced by means of such a molding device. Moreover, the fiber volume content of the resultant composite fiber material can be defined by appropriate dimensioning of the molding device.

In a further advantageous embodiment of the inventive method, the hollow body is expanded before and/or during impregnation and/or during curing by submitting the storage space to an excess pressure. Thereby, the close fit between the hollow body and the element or the elements of a textile sheet material can be improved and a certain degree of pre-stressing of the reinforcing fibers can be obtained. When using a molding device for the process of impregnating the reinforcing fibers, this measure can also contribute to an increase in the fiber volume content due to surplus resin being squeezed out from the gap between the hollow body and the molding device as a result of the expansion process. The impregnation process can be effected in a more controlled and rapid manner by comparatively large gap dimensions before the expansion process, so that the cycle times of the method of the invention can be shortened.

The shaped body or hollow body used in the inventive method can be formed from a synthetic material (e.g., HDPE) or from a metallic material (e.g., steel). In both cases, expansion of the hollow body by subjecting the storage space to an excess pressure is possible if the material is warmed up to a suitable temperature and/or the excess pressure is selected accordingly. From the view point of saving weight, the use of a hollow body made from a synthetic material is particularly advantageous, whereby the fiber reinforcement process can be implemented by means of the inventive method in such a way that the hollow body does not have to make any, or at least any substantial contribution to the strength of the resultant pressure tank.

Thermosetting resins which can be employed in accordance with the invention for impregnating the reinforcing fibers comprise, in particular, epoxy resins, acrylate resins, phenolic resins, vinyl ester resins, bismaleimide resins, unsaturated polyester resins and mixtures thereof. Suitable thermoplastic resins include, in particular, polyetherketones, polyphenylene sulphides, polysulfones, polyamides, polyetherimides and mixtures thereof.

According to another preferred embodiment, the present invention also provides a pressure tank for holding a pressurized fluid, comprising a hollow body which defines a storage space for the fluid, and a composite fiber material surrounding the hollow body which comprises one or more elements of a textile sheet material.

The considerable advantages and preferred embodiments of the inventive pressure tank have already been described with regard to the inventive method.

In particular, the pressure tank in accordance with the invention can be manufactured by means of the inventive method.

The pressure tank of the present invention is suitable with special advantage for the storage of gaseous fuels such as natural gas or hydrogen, e.g., especially in motor vehicles. The usual pressures that can be withstood by the inventive pressure tank typically are in the region of about 200 bar operating pressure in the case of natural gas (bursting pressure about 450 bar) which, in this context, is referred to as CNG (compressed natural gas), or in a range of up to about 700 bar operating pressure in the case of hydrogen.

However, the use of the pressure tank of the invention is not restricted to the field of vehicles. Amongst others, further types of application are for the supply of gas to stationary devices or in the field of fire-extinguishing.

According to a further preferred embodiment, the present invention also provides a pressure tank group comprising a plurality of the inventive pressure tanks which extend in a longitudinal direction and which are arranged in rows and columns in a plane extending perpendicularly to the longitudinal direction, wherein the outer contours of the pressure tanks in the regions which face neighboring pressure tanks are substantially flat, and wherein the pressure tanks are connected to one another by a winding of a reinforcing fiber, wherein the winding runs in at least one plane extending perpendicularly to the longitudinal direction and the reinforcing fiber surrounds each pressure tank along its cross section.

The arrangement of a plurality of pressure tanks to form a group of this type is known, e.g., from DE 102 17 247 A1. Due to this honeycombed form of construction, the pressure tank group is relatively freely configurable and can be adapted very easily to virtually any space, whereas utilization of the space by a single cylindrical pressure tank is not optimal. In particular, the number of rows and columns can be varied independently of one another and the length of the individual tanks can be adapted such that, overall, a larger volume of gas can be accommodated in an equivalent amount of available space (e.g., in a motor vehicle).

In the pressure tank group of the invention, the connection of the individual pressure tanks and also the distribution of the force within the group is effected by a winding of a reinforcing fiber which is provided additionally to the fiber reinforcement of the individual pressure tanks. The winding is implemented in such a way that the reinforcing fiber surrounds each pressure tank along its cross section (perpendicular to the longitudinal direction), so that forces in each region of the pressure tank can be accommodated by the reinforcing fiber.

The reinforcing fiber of the winding is preferably a continuous fiber, e.g., a continuous carbon fiber. The winding of the continuous fiber is preferably implemented in such a way that it extends over substantially the entire length of the pressure tanks, whereby the winding runs in a multiplicity of planes extending perpendicularly to the longitudinal direction and surrounds each pressure tank along its cross section in each one of these planes.

In the pressure tank group of the invention, the individual pressure tanks have differing cross-sectional shapes in dependence on their position within the group, since the outer contours of the mutually facing pressure tanks are substantially flat, while the outer contours of the pressure tanks which point outwardly with respect to the group are preferably curved. The individual pressure tanks can either be manufactured with the appropriate shape ab initio, or cylindrical pressure tanks may be produced firstly, whereafter they are subjected to an excess pressure after being arranged and wound with the continuous fiber, whereby they adopt the appropriate cross-sectional shape due to said excess pressure and due to the distribution of force within the group.

It is particularly preferred if the reinforcing fiber of the winding, i.e., the continuous fiber in particular, is impregnated with a thermosetting or thermoplastic resin. The individual pressure tanks within the group can also be connected to one another in a cohesive manner by means of the resin. It is preferred that the same resin as that from which the composite fiber material of the individual pressure tanks is formed be also used for this purpose. Provision can also be made for the impregnation of the individual pressure tanks and the impregnation of the winding of the reinforcing fiber to be carried out at the same time. A particularly homogeneous structure for the pressure tank group of the invention can thereby be achieved.

These and further advantages of the invention are explained in more detail by means of the following exemplary embodiments and the Figures.

DETAILED DESCRIPTION OF THE INVENTION

Figure 1:
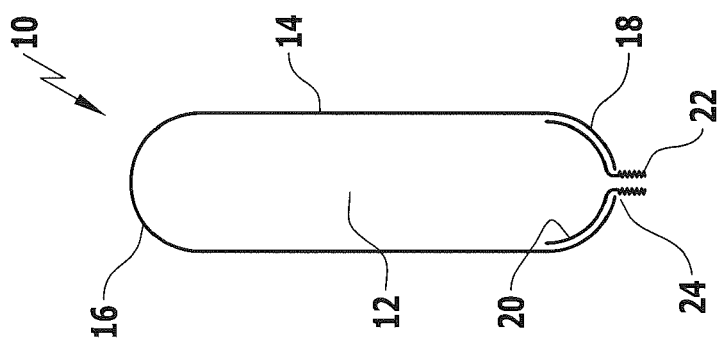
FIG. 1: A sectional view of a hollow body for performing the method of the invention.
Figure 2:
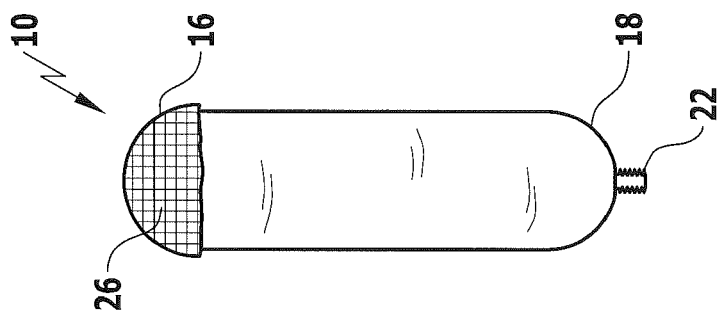
FIG. 2: An illustration of the hollow body of FIG. 1 with an element of a textile sheet material.
Figure 3:
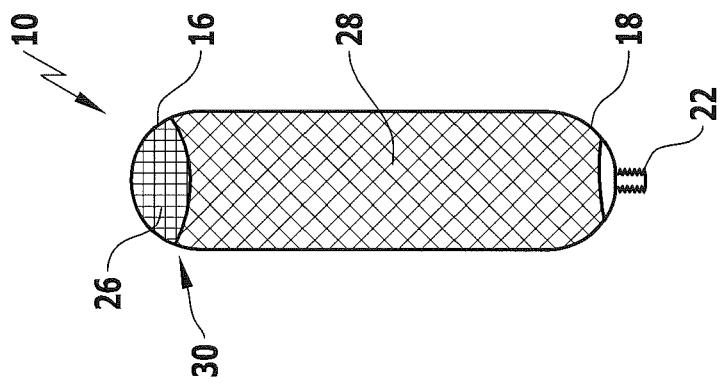
FIG. 3: An illustration of the hollow body of FIG. 2 with a further element of a textile sheet material.

FIGS. 1 to 3 show schematically the sequence followed by the inventive method for producing a pressure tank. The starting point of the method is a hollow body 10 which defines a storage space 12 for a pressurized fluid (e.g., natural gas or hydrogen). The hollow body 10, which is shown in a sectional view in FIG. 1, has a substantially cylindrical shape having a circumferential surface 14 and two axial end regions 16 and 18 which are substantially hemispherical.

In this exemplary embodiment, the hollow body 10 is formed from a synthetic material, e.g., from HDPE. A likewise substantially hemispherical insert 20 made of a metallic material is arranged within the storage space 12 in the lower end region 18 of the hollow body 10. The insert 20 has a connector device 22 which protrudes out of the hollow body 10 through an opening 24 formed therein.

An element 26 of a textile sheet material is arranged on the upper end region 16 of the hollow body 10 in the course of the method of the invention, as illustrated in FIG. 2. The element 26 is a woven fabric of reinforcing fibers (e.g., carbon fibers) which is made substantially hemispherical to correspond with the end region 16. The hemispherical element 26 can, for example, be made from a flat woven fabric by means of a stamping tool.

In this exemplary embodiment, one can dispense with the need for an element of a textile sheet material on the lower end region 18 of the hollow body 10 since the insert 20 itself contributes to the strength of the arrangement in this region.

In the following method step, a further element 28 of a textile sheet material is arranged on the hollow body 10, as illustrated in FIG. 3. The element 28 is a tubular braiding made of reinforcing fibers which completely surrounds the circumferential surface 14 of the hollow body 10 as well as a part of the axial end regions 16 and 18. Due to the flexibility of the tubular braiding 28 in the circumferential direction, it will adapt itself to the outer contour of the hollow body 10. The woven fabric 26 and the tubular braiding 28 overlap in a transition region 30.

Figure 4:
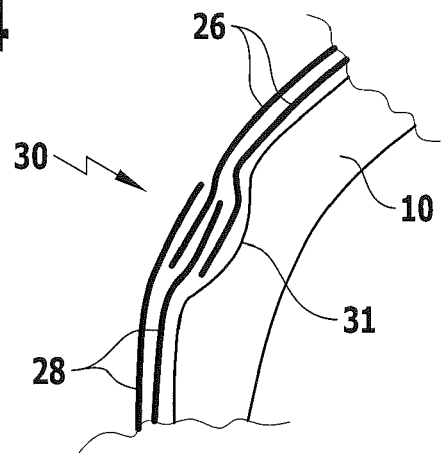
FIG. 4: A detailed illustration of a region of the hollow body with a plurality of elements of a textile sheet material.

Following thereon, further elements 26 (woven fabrics) are arranged on the upper end region 16 and further elements 28 (tubular braidings) are arranged on the circumferential surface 14 of the hollow body 10, wherein the elements 26 and 28 overlap in a staggered manner in the transition region 30. This is shown schematically in the detail view of the transition region 30 depicted in FIG. 4. In order to avoid having sudden jumps in rigidity within this region 30, it is particularly preferred for different elements 26 and 28 to overlap to differing extents. Altogether, e.g., two to eight elements 26 and 28 can be arranged on the hollow body 10. The greater thickness of the overlapping elements 26 and 28 in the transition region 30 can be compensated for by means of a recess 31 in the outer contour of the hollow body 10.

After all of the elements 26 and 28 have been arranged on the hollow body 10, the reinforcing fibers of the textile sheet materials are impregnated with a thermosetting or thermoplastic resin which, after curing, forms a composite fiber material that surrounds the hollow body 10 (not illustrated in the Figure). The hollow body together with the composite fiber material forms a pressure tank in accordance with the invention.

Before impregnating the reinforcing fibers, the hollow body 10 together with the elements 26 and 28 of a textile sheet material can be inserted into a molding device which defines the intended outer contour of the composite fiber material surrounding the hollow body 10. Hereby, the hollow body 10 can be expanded by applying excess pressure to the storage space 12 in order to pre-stress the reinforcing fibers in the elements 26 and 28.

Figure 5:
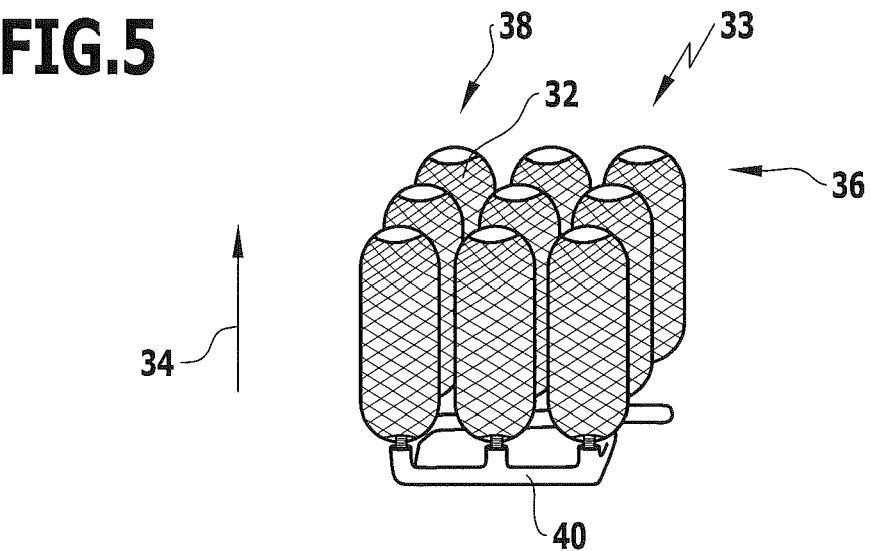
FIG. 5: A perspective illustration of a plurality of inventive pressure tanks for the production of a pressure tank group in accordance with the invention.

FIG. 5 shows a perspective illustration of nine pressure tanks 32 which are arranged such as to produce a pressure tank group 33 in accordance with the invention. The pressure tanks 32 can be manufactured, e.g., according to the previously described method in accordance with FIGS. 1 to 4. The pressure tanks 32 extend in a longitudinal direction 34 and are arranged in three rows 36 and three columns 38 in a plane perpendicular to the longitudinal direction 34. The pressure tanks 32 are connected by a common connector system 40.

Figure 6:
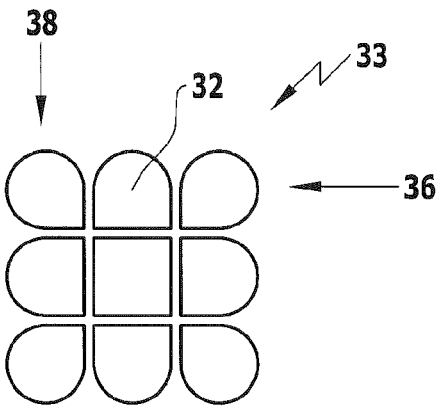
FIG. 6: A cross-sectional illustration of the pressure tanks of FIG. 5.

FIG. 6 shows a cross section through the pressure tanks 32 in a plane perpendicular to the longitudinal direction 34. The pressure tanks 32 have different cross-sectional shapes, wherein the outer contours of the pressure tanks 32 in the regions which face neighboring pressure tanks 32 are substantially flat. The outer contours of the pressure tanks 32 in the regions which are directed outwardly with respect to the pressure tank group 33 are curved.

Figure 7:
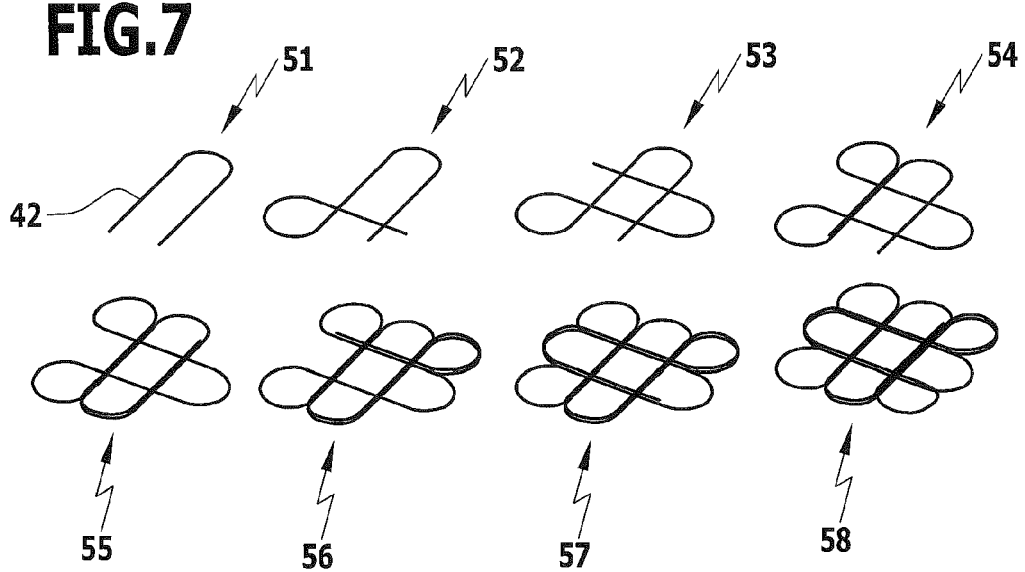
FIG. 7: A schematic illustration of the winding for the connection of the pressure tanks of FIG. 5.

For the purpose of producing the pressure tank group 33 in accordance with the invention, the pressure tanks 32 are connected to one another by a winding of a reinforcing fiber 42, wherein the structure of the winding is schematically illustrated in FIG. 7. The reinforcing fiber 42 runs firstly in a plane perpendicular to the longitudinal direction 34, whereby the structures provided with the reference symbols 51 to 58 are passed through successively. This results in a winding wherein the reinforcing fiber 42 surrounds each pressure tank 32 along its cross section. The sequence of structures 51 to 58 is then repeated successively until the winding extends along substantially the entire length of the pressure tanks 32 in the longitudinal direction 34.

Figure 8:
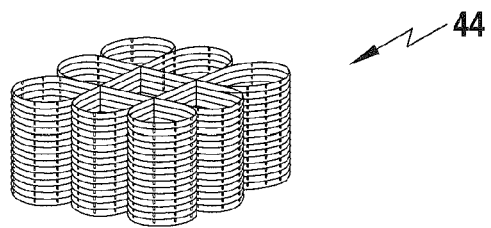
FIG. 8: An illustration of the complete winding in accordance with FIG. 7.

The complete winding 44 is illustrated perspectively in FIG. 8. For the purpose of producing such a winding 44, the reinforcing fiber 42 can either be wound directly around the pressure tanks 32 in accordance with the procedure illustrated in FIG. 7, or the winding 44 is firstly manufactured independently of the pressure tanks 32 by means of a braiding machine, in particular, a so-called 3D braiding machine, and is then arranged around the pressure tanks 32 for the purpose of producing the pressure tank group 33 of the invention.

The reinforcing fiber 42 is subsequently impregnated with a thermosetting or thermoplastic resin in order to fix the winding 44 as well as to connect the pressure tanks 32 to one another in a cohesive manner. The reinforcing fibers of the textile sheet materials of the individual pressure tanks 32 may already have been impregnated beforehand (preferably with the same resin), or they are impregnated at the same time as the reinforcing fiber 42 of the winding 44.

LIST OF REFERENCE SYMBOLS 10 hollow body
12 storage space
14 circumferential surface
16 upper axial end region
18 lower axial end region
20 insert
22 connector device
24 opening
26 element of a textile sheet material (woven fabric)
28 element of a textile sheet material (tubular braiding)
30 transition region
31 recess
32 pressure tank
33 pressure tank group
32 longitudinal direction
36 rows
38 columns
40 connector system
42 reinforcing fiber 44 winding
51 to 58 winding structures

The invention claimed is:

1. A pressure tank group comprising a plurality of pressure tanks for holding a pressurized fluid, each pressure tank comprising a hollow body which defines a storage space for the fluid, and a composite fiber material surrounding the hollow body which comprises one or more elements of a textile sheet material, wherein each pressure tank extends in a longitudinal direction and has a cross-sectional circumference defining an outer contour of the pressure tank, and wherein the plurality of pressure tanks are arranged in rows and columns in a plane extending perpendicularly to the longitudinal direction, wherein the outer contours of the pressure tanks in the regions which face neighboring pressure tanks are substantially flat, and wherein the pressure tanks are connected to one another by a winding of a reinforcing fiber, wherein the winding runs in at least one plane extending perpendicularly to the longitudinal direction and the reinforcing fiber surrounds each pressure tank along its entire cross-sectional circumference, so that a force which is exerted by the pressurized fluid onto the walls of each pressure tank can be distributed by the winding over all pressure tanks in the group.

2. The pressure tank group of claim 1, wherein the textile sheet material comprises a woven fabric or a braiding of reinforced fibers.

3. The pressure tank group of claim 2, wherein the reinforcing fibers of the textile sheet material are selected from carbon fibers, glass fibers, aramide fibers or mixtures thereof.

4. The pressure tank group of claim 1, wherein a plurality of elements of the textile sheet material is arranged on the hollow body of each pressure tank in such a manner that individual elements totally or partly overlap.

5. The pressure tank group of claim 4, wherein the elements of the textile sheet material are arranged in multiple layers on the hollow body.

6. The pressure tank group of claim 1, wherein the hollow body of each pressure tank is substantially in the form of a cylinder, and wherein one or more tubular elements of the textile sheet material are arranged on the circumferential surface of the cylinder.

7. The pressure tank group of claim 6, wherein the axial end regions of the cylinder are substantially hemispherical, and wherein one or more substantially hemispherical elements of the textile sheet material are arranged on one or both end regions.

8. The pressure tank group of claim 1, wherein the hollow body of each pressure tank is formed from a synthetic material or from a metallic material.

9. The pressure tank group of claim 1, wherein the reinforcing fiber of the winding is a continuous fiber.

10. The pressure tank group of claim 1, wherein the reinforcing fiber of the winding is impregnated with a thermosetting or thermoplastic resin.

11. A method for producing a pressure tank for holding a pressurized fluid in the pressure tank group of claim 1, comprising the steps:
providing a shaped body;
arranging one or more elements of a textile sheet material of reinforcing fibers on the shaped body;
impregnating the reinforcing fibers, before or after the arrangement of the element or elements on the shaped body, with a thermosetting or thermoplastic resin; and
curing the resin to form a composite fiber material surrounding the shaped body.

12. The method of claim 11, wherein the shaped body is a hollow body which defines a storage space for the fluid.

13. The method of claim 11, wherein the textile sheet material comprises a woven fabric or a braiding of reinforcing fibers.

14. The method of claim 11, wherein the reinforcing fibers are selected from carbon fibers, glass fibers, aramide fibers or mixtures thereof.

15. The method of claim 11, wherein the element or the elements of a textile sheet material surround the shaped body substantially completely.

16. The method of claim 11, wherein the element or the elements of a textile sheet material are adapted to the outer contour of the shaped body.

17. The method of claim 11, wherein a plurality of elements of a textile sheet material are arranged on the shaped body in such a manner that individual elements totally or partly overlap.

18. The method of claim 17, wherein the elements of a textile sheet material are arranged in multiple layers on the shaped body.

19. The method of claim 17, wherein different elements of a textile sheet material are arranged on regions of the shaped body having a differing outer contour.

20. The method of claim 11, wherein the shaped body is substantially in the form of a cylinder, and wherein one or more tubular elements of a textile sheet material are arranged on the circumferential surface of the cylinder.

21. The method of claim 20, wherein the axial end regions of the cylinder are substantially hemispherical, and wherein one or more substantially hemispherical elements of a textile sheet material are arranged on one or both end regions.

22. The method of claim 11, wherein, before impregnating the reinforcing fibers, the shaped body together with the element or the elements of a textile sheet material is inserted into a molding device which defines the intended outer contour of the composite fiber material surrounding the shaped body.

23. The method of claim 12, wherein the hollow body is expanded before and/or during impregnation and/or during curing by subjecting the storage space to an excess pressure.

24. The method of claim 11, wherein the shaped body is formed from a synthetic material or from a metallic material.

* * * * *